(12) United States Patent
Bon et al.

(10) Patent No.: US 12,309,534 B2
(45) Date of Patent: May 20, 2025

(54) ACTIVATION OF VEHICLE CONVOY REAR CAMERAS

(71) Applicant: Volvo Truck Corporation, Gothenburg (SE)

(72) Inventors: Philippe Bon, St Bonnet de Mure (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 15 days.

(21) Appl. No.: 18/480,615

(22) Filed: Oct. 4, 2023

(65) Prior Publication Data
US 2024/0163403 A1 May 16, 2024

(30) Foreign Application Priority Data
Nov. 16, 2022 (EP) .................................... 22207791

(51) Int. Cl.
*H04N 7/18* (2006.01)
*B60D 1/62* (2006.01)
*B60R 1/26* (2022.01)
*H04N 5/268* (2006.01)

(52) U.S. Cl.
CPC ............... *H04N 7/181* (2013.01); *B60R 1/26* (2022.01); *H04N 5/268* (2013.01); *B60D 1/62* (2013.01)

(58) Field of Classification Search
CPC .......... H04N 7/181; H04N 5/268; B60R 1/26; B60R 2300/105; B60R 2300/40; B60D 1/62; G08G 1/167
See application file for complete search history.

(56) References Cited

U.S. PATENT DOCUMENTS

| | | | |
|---|---|---|---|
| 6,268,803 B1* | 7/2001 | Gunderson | G08G 1/166 340/436 |
| 2013/0194426 A1* | 8/2013 | Schofield | B60R 1/23 348/148 |
| 2014/0022389 A1 | 1/2014 | Kageta | |
| 2015/0172518 A1 | 6/2015 | Lucas et al. | |
| 2016/0039343 A1* | 2/2016 | Jones | G01B 11/14 348/140 |
| 2017/0124881 A1* | 5/2017 | Whitehead | G08G 1/167 |
| 2019/0299862 A1* | 10/2019 | Windeler | H04N 23/56 |

(Continued)

FOREIGN PATENT DOCUMENTS

GB 2529408 A 2/2016

OTHER PUBLICATIONS

ISO, "Road vehicles—Interchange of digital information on electrical connections between towing and towed vehicles—Part 3: Application layer for equipment other than brakes and running gear," International Standard ISO 11992-3, Second Edition, Apr. 15, 2003, 43 pages.

(Continued)

*Primary Examiner* — Farzana Hossain
(74) *Attorney, Agent, or Firm* — Withrow & Terranova, PLLC (57) ABSTRACT

A computer system comprising a processor device is provided. The processor device is configured to determine electronic communication with at least two trailers attached to a vehicle, the trailers and the vehicle each being equipped with a rear-view camera; determine a rearmost camera of the rear view cameras; and activate feed from the rearmost camera to a display of the vehicle.

14 Claims, 9 Drawing Sheets

(56) References Cited

U.S. PATENT DOCUMENTS

| | | | |
|---|---|---|---|
| 2019/0299947 A1* | 10/2019 | Higashitani | B60T 7/22 |
| 2020/0209889 A1* | 7/2020 | Dev | B60R 1/27 |
| 2020/0329216 A1* | 10/2020 | Ribighini | B60R 1/28 |
| 2021/0213878 A1* | 7/2021 | Schondorf | B60R 1/002 |
| 2022/0144169 A1 | 5/2022 | Sperrle et al. | |

OTHER PUBLICATIONS

Extended European Search Report for European Patent Application No. 22207791.9, mailed Mar. 28, 2023, 9 pages.

* cited by examiner

Legend
11: Processing Unit
12: Computer Program
13: Storage Medium
14: Computer System
15: Rear Camera
16: Display
17/18: Interconnected Trailers
19/20: Rear-view Cameras
22/23: Trailer Electronic Control Units (ECUs)

ACTIVATION OF VEHICLE CONVOY REAR CAMERAS

RELATED APPLICATIONS

The present application claims priority to European Patent Application No. 22207791.9, filed on Nov. 16, 2022, and entitled "ACTIVATION OF VEHICLE CONVOY REAR CAMERAS," which is incorporated herein by reference in its entirety.

TECHNICAL FIELD

The disclosure relates generally to a vehicle forming a convoy with at least two trailers. In particular aspects, the disclosure relates to activation of vehicle convoy rear cameras. The to disclosure can be applied in heavy-duty vehicles, such as trucks, buses, and construction equipment. Although the disclosure may be described with respect to a particular vehicle, the disclosure is not restricted to any particular vehicle.

BACKGROUND

Upon a vehicle (e.g., a truck) moving in a reverse direction, a rear camera of the truck is commonly used for providing a rear view to a driver via a display arranged in a truck cabin. However, when the truck forms a convoy with one or more trailers being attached to a rear of the truck, providing a correct convoy rear view is challenging.

SUMMARY

According to a first aspect of the disclosure, a computer system is provided comprising a processor device configured to determine electronic communication with at least two trailers attached to a vehicle, the trailers and the vehicle each being equipped with a rear view camera, determine a rearmost camera of the rear view cameras and activate feed from the rearmost camera to a display of the vehicle.

The first aspect of the disclosure may seek to resolve an issue of having a feed of a rearmost camera of a convoy being displayed on a display of a vehicle of the convoy. A technical benefit may include to provide a fully automated process of activating an appropriate rear camera upon forming a convoy.

According to a second aspect of the disclosure, a computer-implemented method is provided comprising determining, by a processor device of a computer system of a vehicle, electronic communication with at least two trailers attached to the vehicle, the trailers and the vehicle each being equipped with a rear view camera, determining, by the processor device, a rearmost camera of the rear view cameras and activating, by the processor device, feed from the rearmost camera to a display of the vehicle.

In some examples, the determining of a rearmost camera of the rear view cameras comprises determining, by the processor device, a predefined communication address at which each trailer is located in relation to the vehicle and determining, by the processor device, the rearmost camera of the rear view cameras based on the predefined communication addresses. A technical benefit may include the processor device concluding which camera, out of a plurality of cameras, is the rearmost camera.

In some examples, the address number of each predefined communication address indicates trailer order in a convoy formed by the vehicle and the at least two trailers. A technical benefit may include the processor device concluding which camera, out of a plurality of cameras, is the rearmost camera from the address number.

In some examples, the processor device suppresses feed from the other rear view cameras to the display. A technical benefit may include the processor device only activating the feed of the rearmost camera of the convoy.

In some examples, the suppressing of feed from the rear view cameras of the other trailers to the display of the vehicle comprising requesting, by the processor device a computer system of the other trailers to omit transmission of the feed of the rear view cameras of the other trailers. A technical benefit may include the processor device communicating with computer system of the other trailers to suppress transmission of the feed of the rear view cameras not being the rearmost cameras of the convoy.

In some examples, the determining of electronic communication with at least two trailers attached to the vehicle comprises determining, by the processor device, electronic communication with at least two trailers attached to the vehicle by the at least two trailers connecting to a communication bus upon attachment to the vehicle, to which communication bus the processor device is connected, In some examples, the communication bus is a Controller Area Network (CAN) bus, an Ethernet bus, or a Local Interconnect Network (LIN) bus.

In some examples, the electronic communication between the vehicle and the at least two trailers is established via a wireless communication device of the vehicle. A technical benefit may include the processor device communicating wirelessly with devices to which the processer device has no wired connection.

In some examples, the wireless communication device of the vehicle is capable of communication via Wi-Fi, a mobile phone network, a vehicle-to-vehicle (V2V) communication network or
Bluetooth.

In some examples, the processor device determines detachment of at least the rearmost trailer, determines a rearmost camera of the remaining rear view cameras and activates feed from the rearmost camera of the remaining rear view cameras to a display of the vehicle. A technical benefit may include the processor device determining a rearmost camera of the convoy upon detachment of one or more trailers from the convoy communicating with computer system of the other trailers to suppress transmission of the feed of the rear view cameras not being the rearmost cameras of the convoy.

In some examples, the activating of the feed from the rearmost camera to a display of the vehicle comprises requesting, by the processor device, a computer system of the rearmost trailer (18) to transmit the feed of the rearmost camera.

In some examples, the activating of the feed from the rearmost camera to a display of the vehicle comprises receiving, by the processor device, the feed of the rearmost camera via a computer system of the rearmost trailer upon the rearmost trailer attaching to the vehicle.

In some examples, a vehicle is provided comprising the processor device configured to perform the method of the second aspect.

In some examples, a computer program product is provided comprising program code for performing, when executed by the processor device, the method of the second aspect.

In some examples, a control system is provided comprising one or more control units configured to perform the method according to the second aspect.

In some examples, a non-transitory computer-readable storage medium is provided comprising instructions, which when executed by the processor device, cause the processor device to perform the method of the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
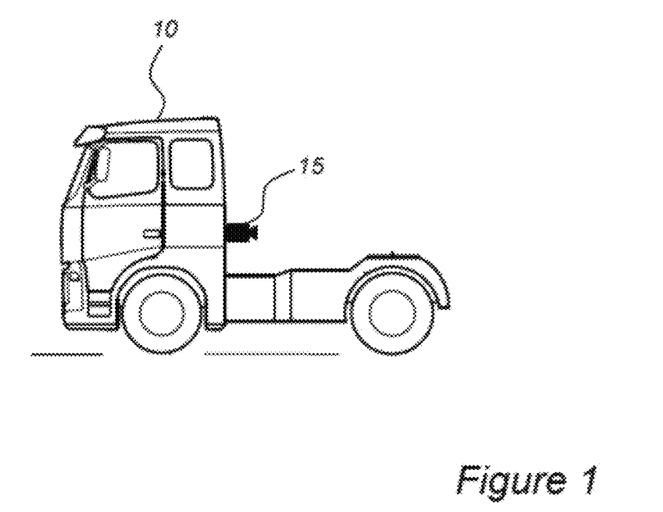
FIG. 1 illustrates a vehicle in the form of truck being equipped with a rear camera.
Figure 2:
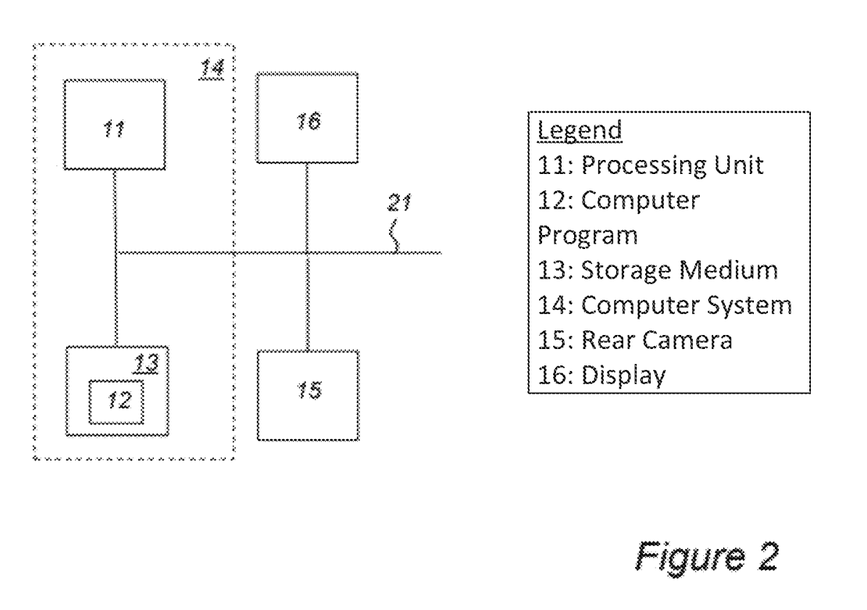
FIG. 2 illustrates a system diagram according to an example of the present disclosure.

FIG. 1 illustrates a vehicle in the form of truck 10 being equipped with a rear camera 15. As shown in FIG. 2, such rear camera 15 is typically in communicative connection with a display 16 located in a cabin of the truck 10 to allow a driver of the truck 10 to attain a rear view of the truck 10 via the display 16 without having to turn his/her head towards a rear direction of the truck 10. As is understood, the display 16 may be fixed in the cabin or portable, such has e.g., a tablet or smart phone.

The rear camera 15 is typically activated to display a rear view when the truck 10 moves in a reverse direction, but may alternatively be activated at any time by the driver for attaining a rear view via the display.

Further, the truck 10 is equipped with a computer system 14 e.g., in the form of a so-called Electronic Control Unit (ECU) controlling operation of the truck 10.

The ECU 14 generally comprises a processing unit 11 embodied in the form of one or more microprocessors arranged to execute a computer program 12 downloaded to a storage medium 13 associated with the microprocessor, such as a Random Access Memory (RAM), a Flash memory or a hard disk drive. The processing unit 11 is arranged to cause the ECU 14 to perform desired operations when the appropriate computer program 12 comprising computer-executable instructions is downloaded to the storage medium 13 and executed by the processing unit 11. The storage medium 13 may also be a computer program product comprising the computer program 12. Alternatively, the computer program 12 may be transferred to the storage medium 13 by means of a suitable computer program product, such as a Digital Versatile Disc (DVD) or a memory stick. As a further alternative, the computer program 12 may be downloaded to the storage medium 13 over a network. The processing unit 11 may alternatively be embodied in the form of a digital signal processor (DSP), an application specific integrated circuit (ASIC), a field-programmable gate array (FPGA), a complex programmable logic device (CPLD), etc. The processing device 11 will in the following be referred to as a central processing unit (CPU). The communication between the rear camera 15 and the display 16 may e.g., occur via a Controller Area Network (CAN) bus, which is commonly used in vehicles for allowing device communication. In other examples, communication is performed via an Ethernet bus, a Local Interconnect Network (LIN) bus, etc. or a wireless network, such as a local Wi-Fi network, a mobile phone network, a vehicle-to-vehicle (V2V) communication network or even Bluetooth. In the following, the communication is exemplified to be performed via a CAN bus 21 complying e.g., with the ISO 11992-2 standard.

Further, a combination of wired and wireless communication may be envisaged. For instance, a first trailer connecting to the truck 10 communicates with the truck 10 via the CAN bus while a second trailer connecting to the truck 10 utilizes wireless V2V communication.

Communication between devices connected to the CAN bus 21 is typically supervised and controlled by the CPU 11 of the ECU 14 with which the truck 10 is arranged.

Figure 3:
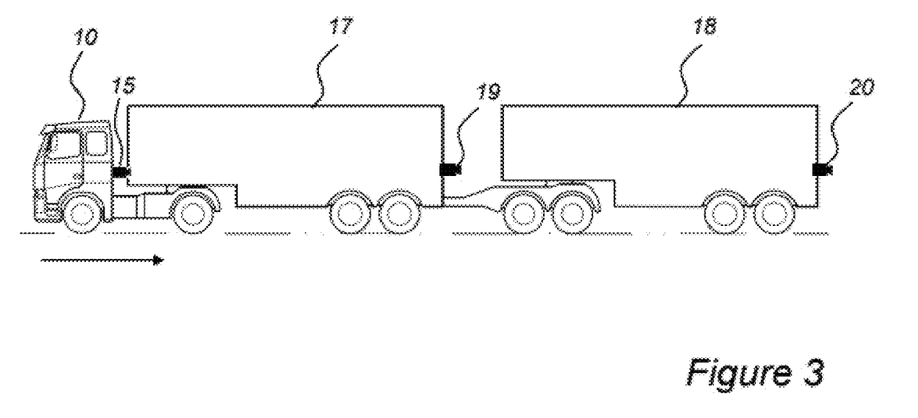
FIG. 3 illustrates the truck forming a convoy with a first and a second trailer.

Although the vehicle 10 in FIG. 1 is depicted as a heavy-duty truck, examples of the present disclosure may be implemented in other types of vehicles, such as in passenger cars, busses, light-weight trucks, mid-weight trucks, construction equipment, motorcycles, marine vessels, etc. FIG. 3 illustrates an example where the truck 10 attaches to two interconnected trailers 17, 18 for forming a convoy, each trailer comprising a rear view camera 19, 20. A problem is then for the processing unit 11 of the truck 10 how to ascertain that a feed the rearmost camera 20 of the convoy is rendered on the display 16 of the truck 10. Typically, while attaching to interconnected first trailer 17 and second trailer 18 to form a convoy, the feed of the rear-view camera 15 of the truck 10 is displayed on the display 16. The first trailer 17 and the second trailer 18 may be consecutively or concurrently attached. For example, the first trailer 17 and the second trailer 18 may be already interconnected when attached to the truck 10.

Figure 4:
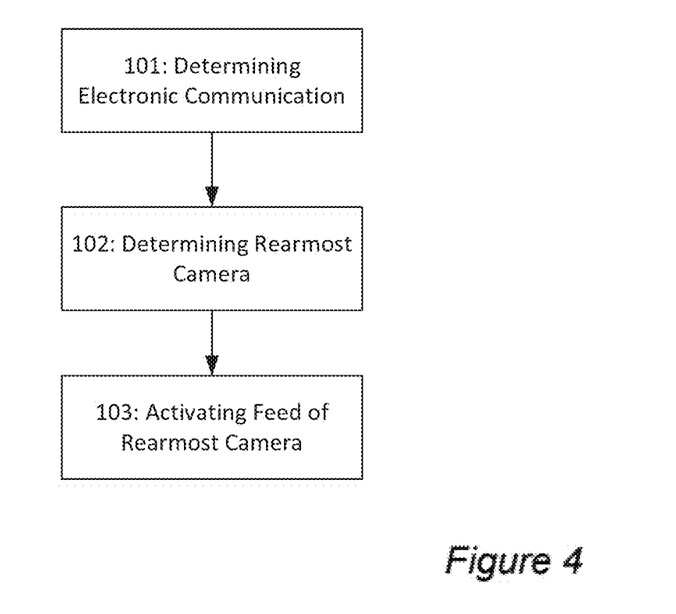
FIG. 4 shows a flowchart of a method of the truck forming a convoy with the first trailer and the second trailer in an example.
Figure 5:
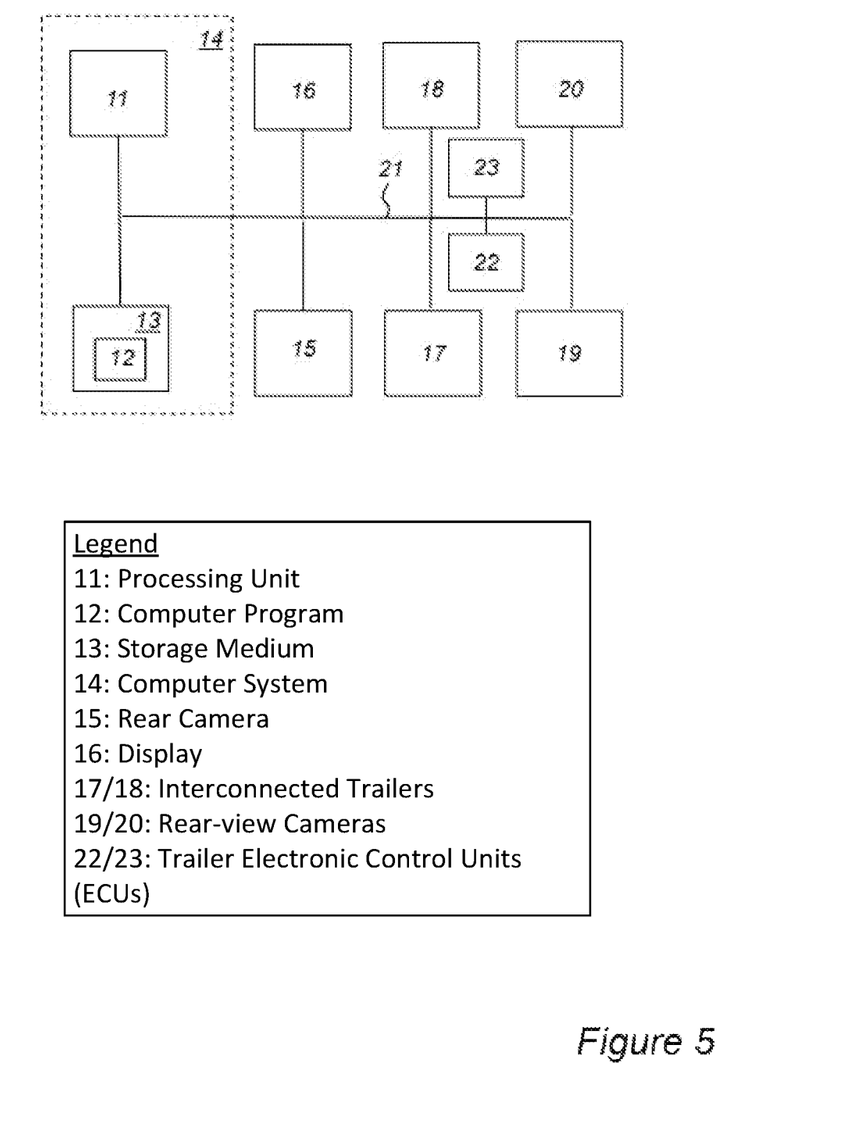
FIG. 5 illustrates a system diagram according to another example of the present disclosure.

This is resolved in an example of the present disclosure by the CPU 11 of the ECU 14 of the truck 14 by an example method described with reference to a flowchart of FIG. 4. Reference will further be made to a system diagram of FIG. 5 illustrating connection of the ECU 14 of the truck 10 to the first trailer 17 and to the second trailer 18 and thus to the respective rear-view camera 19, 20.

Hence, upon attaching to the trailers 17, 18, the CPU 11 determines in 101 electronic communication with the trailers 17, 18 in that the trailers 17, 18 upon attachment to the truck 10 connect to the CAN bus 21 and thus to the CPU 11.

As is understood, similar to the truck 10, each of the trailers 17, 18 comprises an ECU 22, 23 configured to manage communication of the respective trailer 17, 18 over the CAN bus 21. Thereafter, the CPU 11 determines in 102 a rearmost camera 20 of the three rear view cameras 15, 19, 20 and activates in 103 feed from the rearmost camera— being the rear camera 20 of the second trailer 18—to the display 16 of the truck 10.

The CPU 11 has thus supplied the feed of the rearmost camera 20 of the convoy, thereby enabling for the driver of the truck 10 to attain a rear view of the truck 10 via the display 16 without having to turn his/her head in rear direction of the truck 10.

Further, to the driver of the truck 10, the process of activating/deactivating the appropriate rear cameras upon forming a convoy with the trailers 17, 18 is fully automated, and there is no need for the driver to perform any manual camera management or detection of trailer attachment.

Figure 6:
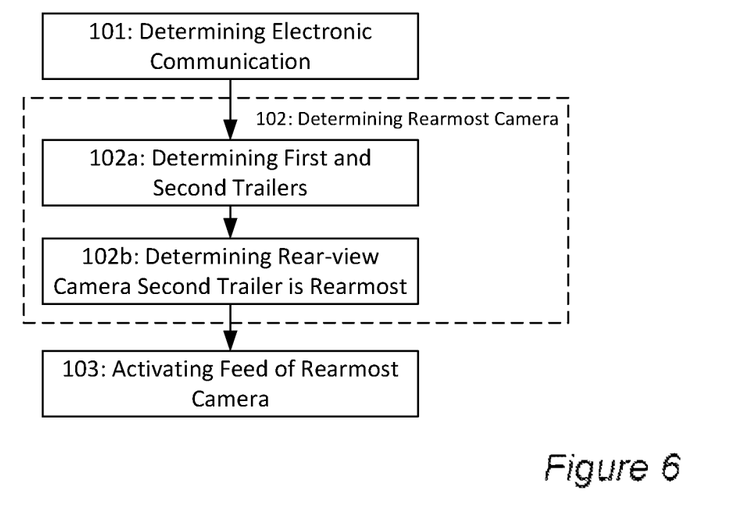
FIG. 6 shows a flowchart of a method of the truck forming a convoy with the first trailer and the second trailer in another example.

FIG. 6 shows a flowchart illustrating an example method wherein upon the trailers 17, 18 attaching to the truck 10 and thus the ECUs 22, 23 connecting to the CAN bus 21 and establishing communication with the CPU 11 of the ECU 14 of the truck 10 in 101, in accordance with the previously mentioned ISO 11992-2 standard, an address translation mechanism is exploited. This mechanism will further be described with reference to FIG. 7.

Figure 7:
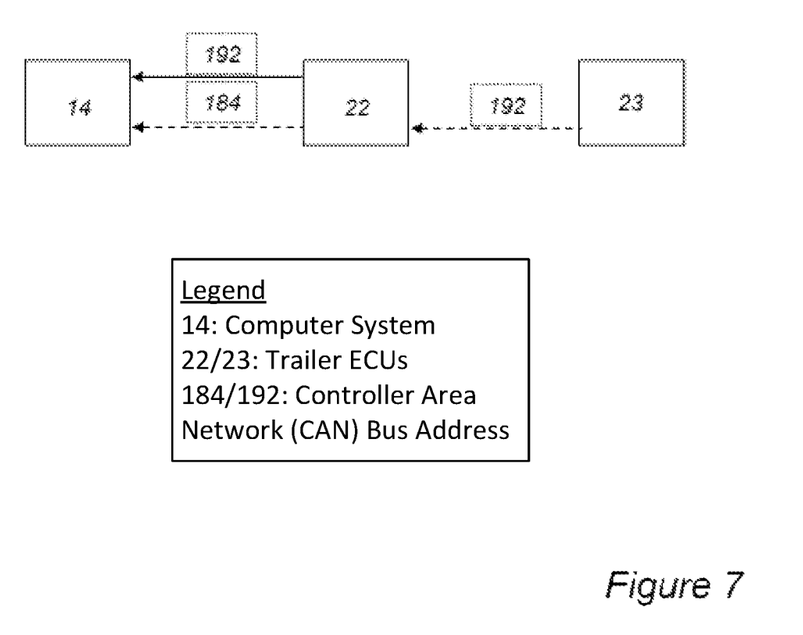
FIG. 7 illustrates a CAN bus address translation mechanism.

Now, upon attachment of the trailers 17, 18 to the truck 10, each ECU 22, 23 may under ISO 11992-2 communicate over the CAN bus 21 with an immediately preceding vehicle (i.e., trailer or truck) utilize CAN bus address 192.

Thus, the ECU 23 of the second trailer 18 may communicate with the ECU 22 of the first trailer 17 via address 192, and the ECU 22 of the first trailer 17 may in its turn communicate with the ECU 14 of the truck 10 using address 192 while performing translation of address 192 used by the ECU 23 of the second trailer 18 such that any data communicated by the second trailer 19 via the first trailer 18 is communicated to the ECU 14 of the truck 10 from the ECU 22 of the first trailer 17 using CAN bus address 184.

As is understood, should a further trailer be attached to the convoy, that further trailer would communicate with the second trailer 18 using address 192 and—after two address translations being performed via the first and second trailers 17, 18—ultimately communicate with the truck via CAN bus address 176.

As a result, from the perspective of the ECU 14 of the truck 10, a predefined bus address may be assigned for communication with each of the trailers 17, 18, where:
communication with the first trailer 17 is performed via CAN bus communication address 192;
communication with the second trailer 18 is performed via address 184; and
communication with a potential third trailer is performed via address 176, and so on.

The CPU 11 of the ECU 14 may hence in 102*a* conclude that a trailer (and corresponding ECU) communicating via CAN bus address 192 is the first trailer 17 (and first ECU 22) while a trailer communicating over address 184 via the first trailer 17 is the second trailer 18 (and second ECU 23).

A third trailer would according to the ISO 11992-2 standard correspondingly communicate with the truck 10 via the first and second trailers 17, 18 by using address 176, and so on. The CPU 11 communicates with the rear camera 15 of the truck 10 via address 200.

In this particular example, the CPU 11 determines in 102*b* that the rear camera 20 of the second trailer 18 being located as bus address 184 must be the rearmost camera and activates the feed of the determined rearmost camera 20 to the display 16 of the truck 10 via the CAN bus 21 in 103.

With this example method of the present disclosure, the CPU 11 of the ECU 14 with which the truck is equipped will be able to determine which of the rear cameras 15, 19, 20 is the rearmost camera of the convoy from the order of the CAN bus addresses via which the ECU 14 of the truck 10 and the ECUs 22, 23 of the first and second trailers 17, 18 communicate. As is understood, the CPU 11 does not need information beforehand as regards the number of interconnected trailers to which the truck 10 attaches; any second trailer is located at bus address 184, while a third trailer is located at bus address 176, and so on, from the perspective of the truck 10. Hence, address number of each predefined communication address indicates trailer order in a convoy formed by the truck 10 and the trailers 17, 18.

In an example, the CPU 11 activates the feed of the determined rearmost camera 20 to the display 16 of the truck 10 via the CAN bus 21 in 103 by actively requesting the feed from the rearmost camera 20 via address 184 of the CAN bus 21.

In another example, the second trailer 18 actively provides the feed of the rearmost camera 20 upon attachment via address 192 to the first trailer 17 and further on to the truck 10 via address 184, while the preceding vehicle—i.e. the first trailer 17—refrains from providing the feed of the rear camera 19 since a further rearmost trailer is present in the convoy.

Figure 8:
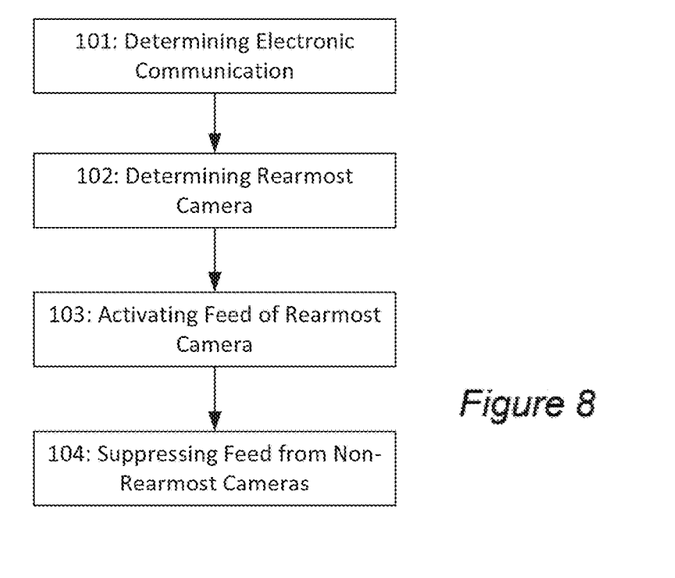
FIG. 8 shows a flowchart of a method of the truck forming a convoy with the first trailer and the second trailer in yet another example.

FIG. 8 shows a flowchart illustrating an example method wherein after the CPU 11 of the truck 10 determines communication with the trailers 17, 18 in 101, determines the rearmost camera 20 in 102 and activates the feed of the rearmost camera 20 to the truck display 16 in 103 as previously described, the CPU 11 further supresses any feed from the remaining rear cameras 15, 19 to the display 16.

As previously mentioned, upon the truck 10 attaching to the trailers 17, 18, the rear camera 15 of the truck 10 is typically activated to provide the driver of the truck 10 with a rear view via the display 16.

Hence, after having activated the feed from the rearmost camera 20 to the display 16 of the truck 10 in 103, the CPU 11 will suppress feed from the other rear-view cameras 15, 19 to the display in 104. As is understood, the suppressing of the feed from the other rear-view cameras 15, 19 to the display 16 in 104 may be performed before, or simultaneously with, the activation of the feed from the rearmost camera 20 to the display 16 of the truck 10 in 103.

In an example, the CPU 11 may perform a ping, thereby alerting all rear cameras 15, 19, 20 to provide a respective feed, in which case the CPU 11 may need to suppress the feed of the truck rear camera 15 and the rear camera 19 of the first trailer 17.

However, as previously mentioned, the CPU 11 may actively request the second ECU 23 to transmit the feed of the rear-view camera 20 of the second trailer 18. In another scenario, the feed may already be activated by the second ECU 23 upon the truck 10 attaching to the trailers 17, 18, in which case the feed is routed by the ECU 14 of the truck 10 to the display 16. This may further include supressing the feed of the rear camera 19 of the first trailer 17 and the feed of the truck rear camera 15, should these two feeds already be activated at attachment.

Figure 9:
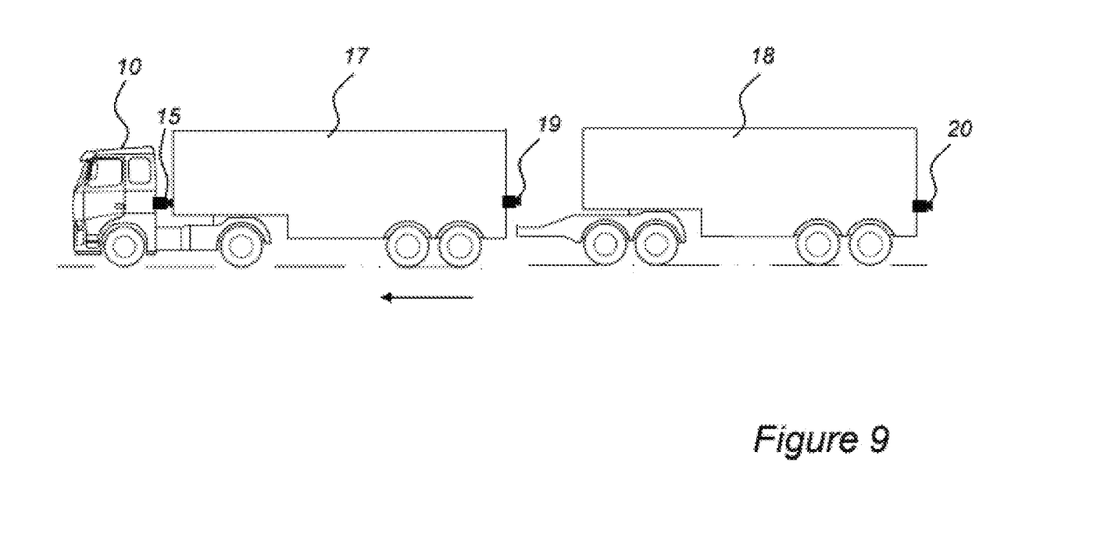
FIG. 9 illustrates the second trailer being detached from the convoy.
Figure 10:
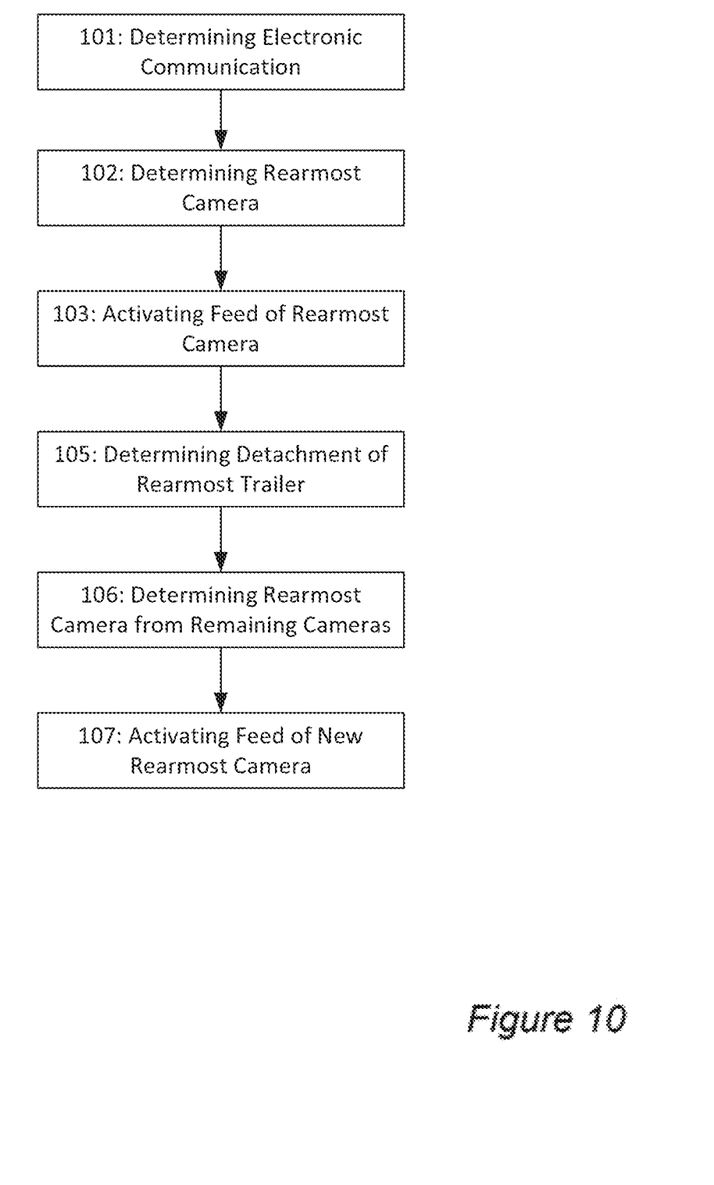
FIG. 10 shows a flowchart of a method of the second trailer being detached from the convoy in an example.

FIG. 9 illustrates an example where the second trailer 18 is disconnected form the convoy. Reference is further made to FIG. 10 showing a flowchart illustrating an example method.

After having activated the feed from the rear camera 20 of the second trailer 18 to the display 16 of the truck 10 in 103, it may be that—typically after some time of convoy operation—it is determined that the second trailer 18 should be detached from the convoy as illustrated in 104. In other words, detachment of the rearmost trailer 18 of the convoy is determined in 104 by the CPU 11.

In 106, the CPU 11 determines a rearmost camera 19 of the remaining rear-view cameras 15, 19 in the convoy. As described hereinabove, after the second trailer 18 has detached in 105, the CAN bus communication address 192 assigned to the first trailer 17 indicates that the first trailer 17 now is the rearmost trailer of the convey, since there is no longer a trailer in the convoy communicating via address 184, and the CPU 11 activates the feed from rear camera 19 of the first trailer 17 to the truck display 16.

Figure 11:
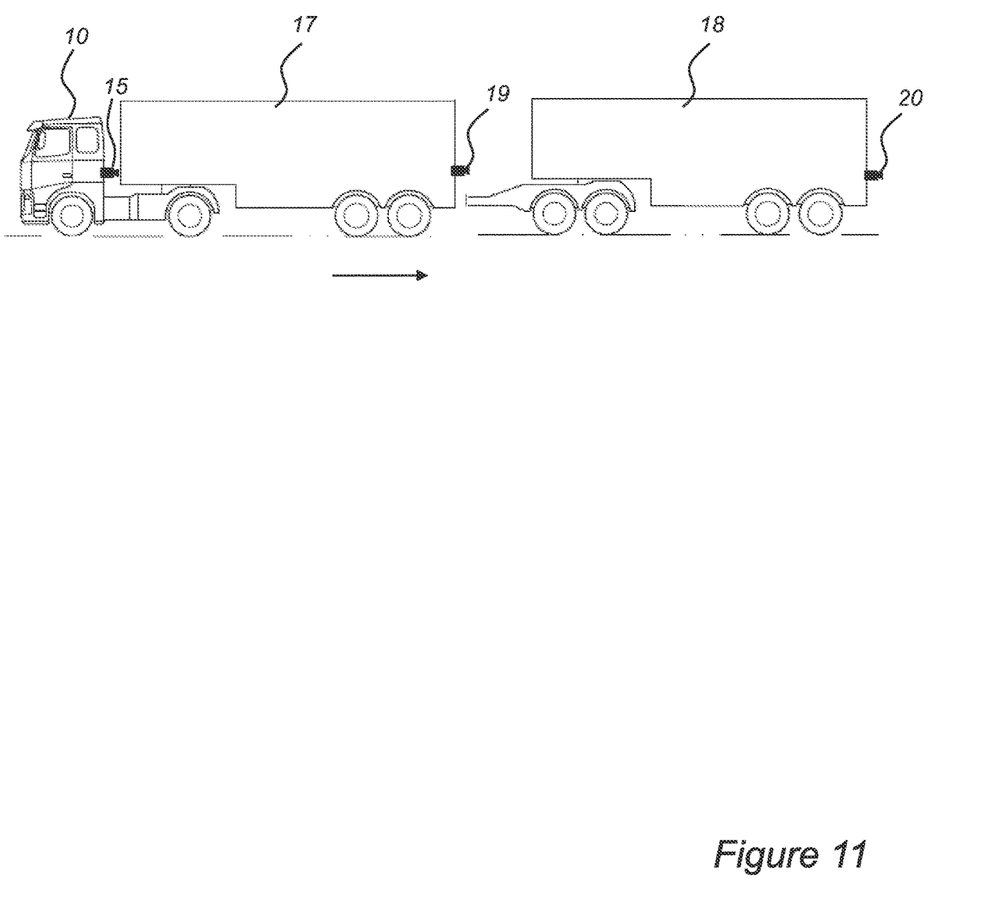
FIG. 11 illustrates the truck and the first trailer attaching to the second trailer.

While FIG. 3 illustrates a scenario where the truck 10 attaches to two interconnected trailers 17, 18 it may be that that the truck 10 initially attaches to the first trailer 17 and thereafter the convoy comprising the truck 10 and the first trailer 17 attaches to the second trailer, as shown in FIG. 11.

Again with reference to the flowchart of FIG. 8, upon the truck 10 and the first trailer 17 attaching to the second trailers 17, 18, the CPU 11 determines in 101 electronic communication with the second trailer 18 in that the second trailer 18 upon attachment to the truck 10 connects to the CAN bus 21 and thus to the CPU 11.

Thereafter, the CPU 11 determines in 102 a rearmost camera 20 of the three rear view cameras 15, 19, 20 and activates in 103 feed from the rearmost camera—being the rear camera 20 of the second trailer 18—to the display 16 of the truck 10.

Hence, in accordance with the CAN bus standard, the CPU 11 determines that the first trailer 17 located at communication address 192 no longer is the rearmost trailer of the convoy, since the second trailer 18 is assigned communication address 184.

In 104, the CPU 11 will activate the feed of the rearmost camera 20 of the convoy, while suppressing the feed for the (no longer rearmost) rear camera 19 of the second trailer 17.

While communication between the truck 10 and the trailers 17, 18 has been exemplified as being undertaken via wired CAN bus connections, it may also be envisaged that wireless communication between the truck 10 and the trailers 17, 18 is utilized (or a combination of wired and wireless communication). Ultimately, communication between any two devices in the convoy may be performed via wireless communication, such as the communication between three ECUs 14, 22, 23, given that the devices are capable of wireless communication.

Figure 12:
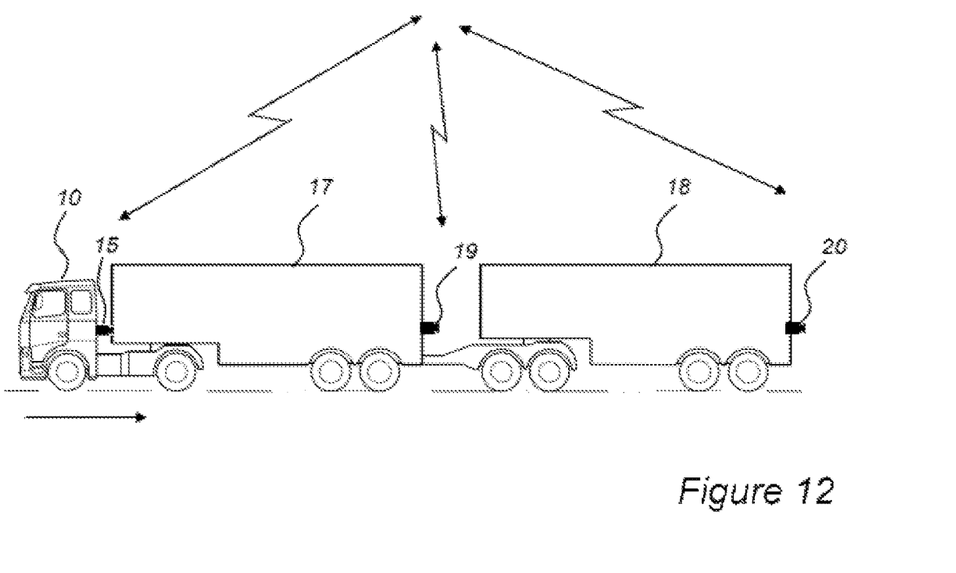
FIG. 12 illustrates the truck performing wireless communication with the first and a second trailer.

FIG. 12 illustrates a scenario where the truck 10 attaches to two interconnected trailers 17, 18 as has been described in detail hereinabove. In this example, it is assumed that ECU 14 of the truck 10 communicates with the first ECU 22 and the second ECU 23 via the wired CAN communication bus 21 upon trailer attachment to the truck 10.

Figure 13:
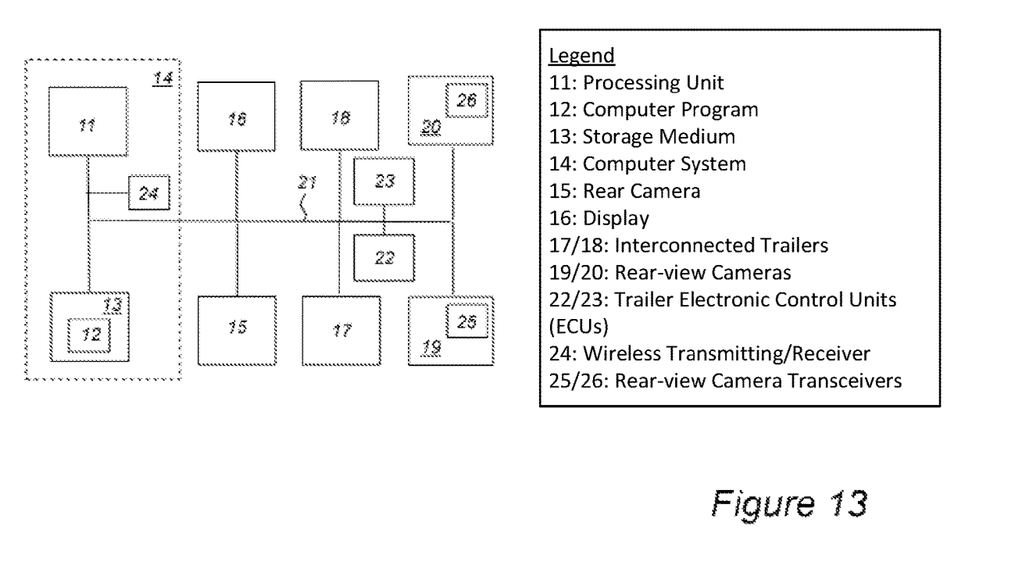
FIG. 13 illustrates a system diagram according to another example of the present disclosure.

However, as illustrated in FIG. 13, in this particular example, the ECU 14 of the truck 10 is equipped with a wireless transmitter/receiver 24 (commonly referred to as a transceiver) for wireless communication with remotely located devices.

Further in this example, the rear view cameras 19, 20 are each equipped with wireless transceivers 25, 26. Thus, upon the ECU 14 of the truck 10 establishing communication with the first ECU 22 and the second ECU 23, the respective ECU 22, 23 may provide the ECU 14 of the truck 10 with a communication address of each rear camera 19, 20, thereby allowing the ECU 14 of the truck 10 to activate the feed of the rearmost camera 20 to the display 16 via wireless communication between the transceivers 24, 26 (and potentially having the transceiver 24 to send a message to the transceiver 25 of the rear camera 19 of the first trailer 19 to perform camera feed suppression).

Figure 14:
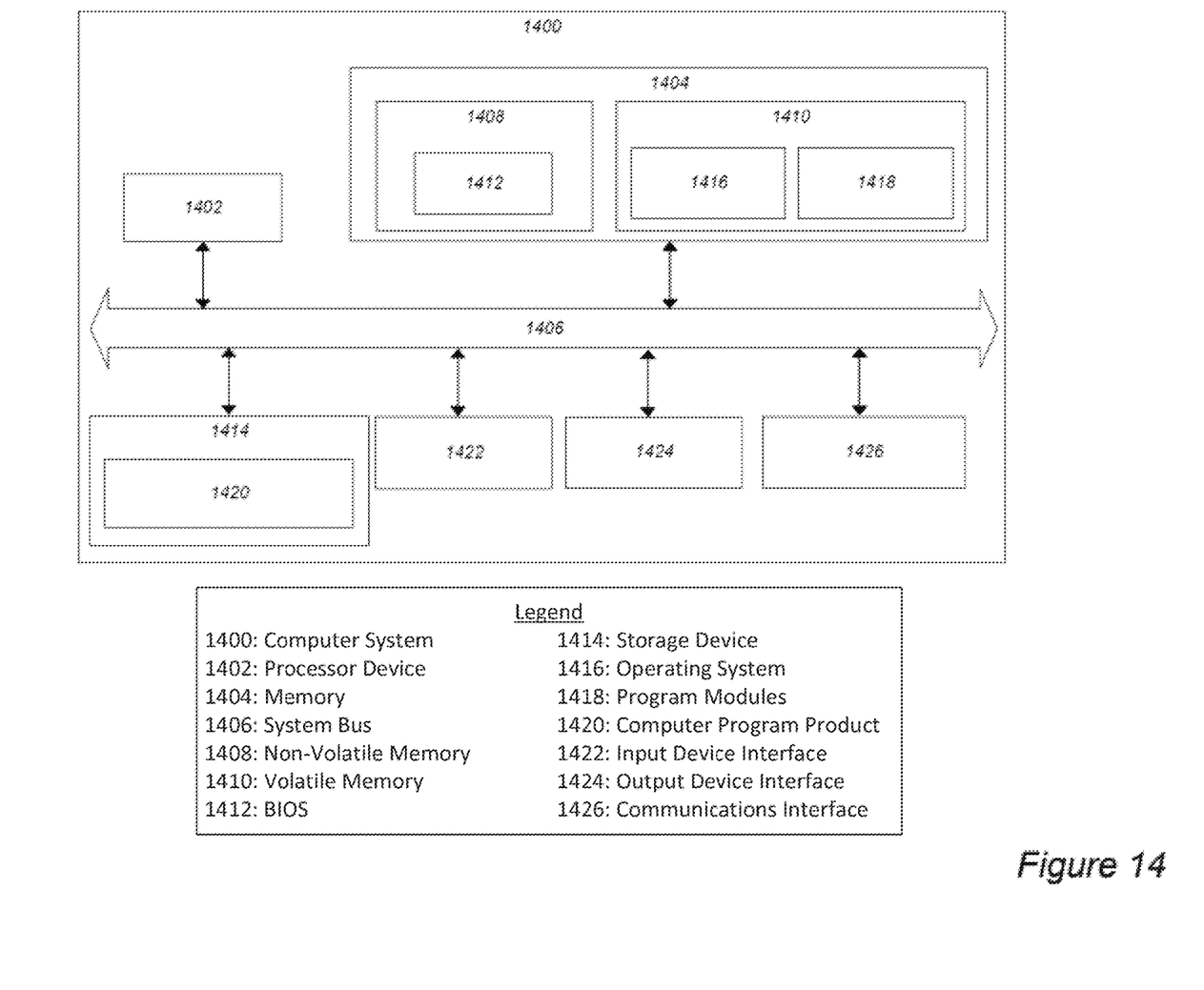
FIG. 14 shows a schematic diagram of a computer system for implementing examples disclosed herein.

FIG. 14 is a schematic diagram of a computer system 1400 for implementing examples disclosed herein. The computer system 1400 is adapted to execute instructions from a computer-readable medium to perform these and/or any of the functions or processing described herein. The computer system 1400 may be connected (e.g., networked) to other machines in a LAN, an intranet, an extranet, or the Internet. While only a single device is illustrated, the computer system 1400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1400 may comprise at least one computing device or electronic device capable of including firmware, hardware, and/or executing software instructions to implement the functionality described herein. The computer system 1400 may include a processor device 1402 (may also be referred to as a control unit), a memory 1404, and a system bus 1406. The computer system 1400 may include at least one computing device having the processor device 1402. The system bus 1406 provides an interface for system components including, but not limited to, the memory 1404 and the processor device 1402. The processor device 1402 may include any number of hardware components for conducting data or signal processing or for executing computer code stored in memory 1404. The processor device 1402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1406 may be any of several types of bus structures that may further interconnect to a memory bus (with or without a memory controller), a peripheral bus, and/or a local bus using any of a variety of bus architectures. The memory 1404 may be one or more devices for storing data and/or computer code for completing or facilitating methods described herein. The memory 1404 may include database components, object code components, script components, or other types of information structure for supporting the various activities herein. Any distributed or local memory device may be utilized with the systems and methods of this description. The memory 1404 may be communicably connected to the processor device 1402 (e.g., via a circuit or any other wired, wireless, or network connection) and may include computer code for executing one or more processes described herein. The memory 1404 may include non-volatile memory 1408 (e.g., read-only memory (ROM), erasable programmable read-only memory (EPROM), electrically erasable programmable read-only memory (EEPROM), etc.), and volatile memory 1410 (e.g., random-access memory (RAM)), or any other medium which can be used to carry or store desired program code in the form of machine-executable instructions or data structures and which can be accessed by a computer or other machine with a processor device 1402. A basic input/output system (BIOS) 1412 may be stored in the non-volatile memory 1408 and can include the basic routines that help to transfer information between elements within the computer system 1400.

The computer system 1400 may further include or be coupled to a non-transitory computer-readable storage medium such as the storage device 1414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1414 and/or in the volatile memory 1410, which may include an operating system 1416 and/or one or more program modules 1418. All or a portion of the examples disclosed herein may be implemented as a computer program product 1420 stored on a transitory or non-transitory computer-usable or computer-readable storage medium (e.g., single medium or multiple media), such as the storage device 1414, which includes complex programming instructions (e.g., complex computer-readable program code) to cause the processor device 1402 to carry out actions described herein. Thus, the computer-readable program code can comprise software instructions for implementing the functionality of the examples described herein when executed by the processor device 1402. The processor device 1402 may serve as a controller or control system for the computer system 1400 that is to implement the functionality described herein.

The computer system 1400 also may include an input device interface 1422 (e.g., input device interface and/or output device interface). The input device interface 1422 may be configured to receive input and selections to be communicated to the computer system 1400 when executing instructions, such as from a keyboard, mouse, touch-sensitive surface, etc. Such input devices may be connected to the processor device 1402 through the input device interface 1422 coupled to the system bus 1406 but can be connected through other interfaces such as a parallel port, an Institute of Electrical and Electronic Engineers (IEEE) 1494 serial port, a Universal Serial Bus (USB) port, an IR interface, and the like. The computer system 1400 may include an output device interface 1424 configured to forward output, such as to a display, a video display unit (e.g., a liquid crystal display (LCD) or a cathode ray tube (CRT)). The computer system 1400 may also include a communications interface 1426 suitable for communicating with a network as appropriate or desired.

The operations described in any of the exemplary aspects herein are described to provide examples and discussion. The operations may be performed by hardware components, may be embodied in machine-executable instructions to cause a processor to perform the operations, or may be performed by a combination of hardware and software. Although a specific order of method operations may be shown or described, the order of the operations may differ. In addition, two or more operations may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, operations, elements, and/or components, but do not preclude the presence or addition of one or more other features, integers, actions, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising:
a processor device configured to:
   determine electronic communication with at least two trailers attached to a vehicle, the at least two trailers and the vehicle each being equipped with a rear view camera;
   determine, by the processor device, a predefined communication address at which each trailer of the at least two trailers is located in relation to the vehicle;
   determine, by the processor device, a rearmost camera of the rear view cameras based on the predefined communication addresses; and
   activate a feed from the rearmost camera to a display of the vehicle.

2. The computer system of claim 1, wherein an address number of each predefined communication address indicates trailer order in a convoy formed by the vehicle and the at least two trailers.

3. A computer-implemented method, comprising:
determining, by a processor device of a computer system of a vehicle, electronic communication with at least two trailers attached to the vehicle, the at least two trailers and the vehicle each being equipped with a rear view camera;
determining, by the processor device, a predefined communication address at which each trailer is located in relation to the vehicle;
determining, by the processor device, a rearmost camera of the rear view cameras based on the predefined communication addresses, wherein the trailer of the at least two trailers comprising the rearmost camera is the rearmost trailer; and
activating, by the processor device, a feed from the rearmost camera to a display of the vehicle.

4. The method of claim 3, further comprising:
suppressing, by the processor device, a feed to the display from rear-view cameras other than the rearmost camera.

5. The method of claim 4, wherein the suppressing feed from the rear-view cameras other than the rearmost camera to the display of the vehicle further comprises:
requesting, by the processor device, a computer system of non-rearmost trailers to omit transmission of the feed of the non-rearmost rear-view cameras.

6. The method of claim 3, wherein the determining electronic communication with at least two trailers attached to the vehicle further comprises:
determining, by the processor device, electronic communication with at least two trailers attached to the vehicle by the at least two trailers connecting to a communication bus upon attachment to the vehicle, wherein the processor device is connected to the communication bus.

7. The method of claim 6, wherein the communication bus is a Controller Area Network (CAN) bus, an Ethernet bus, or a Local Interconnect Network (LIN) bus.

8. The method of claim 3, wherein electronic communication between the vehicle and the at least two trailers is established via a wireless communication device of the vehicle.

9. The method of claim 8, wherein the wireless communication device of the vehicle is capable of communication via Wi-Fi, a mobile phone network, a vehicle-to-vehicle (V2V) communication network, or Bluetooth.

10. The method of claim 3, further comprising:
determining, by the processor device, detachment of at least the rearmost trailer;
determining, by the processor device, a rearmost camera of remaining rear-view cameras; and
activating, by the processor device, a feed from the rearmost camera of the remaining rear-view cameras to the display of the vehicle.

11. The method of claim 3, wherein the activating the feed from the rearmost camera to the display of the vehicle further comprises:
requesting, by the processor device, a computer system of the rearmost trailer to transmit the feed of the rearmost camera.

12. The method of claim 3, wherein the activating the feed from the rearmost camera to the display of the vehicle further comprises:
receiving, by the processor device, the feed of the rearmost camera via a computer system of the rearmost trailer upon the rearmost trailer attaching to the vehicle.

13. A computer program product comprising a non-transitory computer readable medium having stored thereon a computer program for performing, when executed by the processor device, the method of claim 3.

14. A vehicle comprising:
a processor device of a computer system of the vehicle, the processor device configured to:
   determine electronic communication with at least two trailers attached to the vehicle, the at least two trailers and the vehicle each being equipped with a rear view camera,
   determine a predefined communication address at which each trailer is located in relation to the vehicle,
   determine a rearmost camera of the rear view cameras based on the predefined communication addresses, wherein a trailer of the at least two trailers comprising the rearmost camera is the rearmost trailer, and
   activate a feed from the rearmost camera to a display of the vehicle.

* * * * *